3,842,017
PROCESS FOR DEPOSITING NOBLE METAL CATALYSTS ON OXIDE CARRIERS
William H. Armistead and Thomas H. Elmer, Corning, and Ivan E. Lichtenstein, Big Flats, N.Y., assignors to Corning Glass Works, Corning, N.Y.
No Drawing. Filed Dec. 13, 1972, Ser. No. 314,704
Int. Cl. B01j 11/08, 11/12, 11/20
U.S. Cl. 252—474                    3 Claims

ABSTRACT OF THE DISCLOSURE

A process for depositing selected noble metal catalysts on oxide carriers comprising the step of contacting the oxide carriers with a solution containing selected noble metal ions and a formic acid reductant is described. Reduction of the noble metal ions preferentially occurs at the surface of the oxide carrier, resulting in the deposition of a uniform noble metal dispersion thereon. Sensitization of the carrier with hydrolyzable tin compounds to increase the rate and uniformity of catalyst deposition is also described.

BACKGROUND OF THE INVENTION

The use of catalytically-active noble metals such as plantinum, palladium and rhodium supported on refractory metal oxide carriers such as alumina, magnesia, silica and the like is well known in the field of catalysis. Devices comprising noble metal catalysts on oxide supports are used, for example, in oxidation processes wherein gases comprising oxidizable constituents are treated by contact with the supported catalysts at elevated temperautres to promote the oxidation of these constituents.

A large number of processes for depositing noble metal catalysts on oxide supports are also known. For example, one method of applying platinum or palladium to a porous oxide support structure comprises immersing the structure in a solution containing a platinum or palladium salt, and thereafter drying and firing the structure to pyrolytically convert the resulting noble metal salt coating to the noble metal. Unfortunately, such processes do not always provide uniform results. An important requirement of any such deposition procedure is that it provides a uniform dispersion or coating of the noble metal catalyst on the surface of the oxide carrier in order to maximize the exposed active surface area and thus the efficiency of the catalyst. Technically, processes which optimize catalyst dispersion and uniformity will normally be preferred.

From the commercial viewpoint, many of the processes which are technically suitable for the purpose of depositing noble metal catalysts on oxide supports are undesirable because they require numerous and/or expensive process steps or ingredients. A process which could provide a fine and uniform catalyst dispersion without the need for several different treating solutions, fixing steps, special atmospheres or equipment would be of significant commercial importance.

SUMMARY OF THE INVENTION

We have now discovered a process for depositing noble metal catalysts on refractory metal oxide carriers which is simple yet surprisingly effective in producing a uniform dispersion of noble metal thereon. The process comprises the step of contacting the carrier with an aqueous solution containing noble metal catalyst ions and a formic acid reductant. The formic acid reductant does not normally reduce the noble metal ions present in the solution to a significant extent in the absence of an oxide carrier. However, in the presence of such a carrier, particularly in the presence of a carrier which effects a localized rise in pH at the carrier-solution interface, the noble metal ions are reduced and preferentially deposited on the carrier suface.

Noble metals which may be effectively deposited on oxide carriers according to the present invention include platinum, palladium, rhodium, gold, silver and mixtures of these metals. The ions of these metals may be introduced into aqueous solution by the addition of soluble compounds of the noble metals such as the noble metal salts, with soluble halide compounds which form halide-complexed noble metal ions in solution being preferred.

Oxide carriers which may be treated according to the invention include alumina, tin oxide, silica and the like, mixtures of oxides such as alumina-silica mixtures, oxide compounds or other phases such as mullite, cordierite, and spodumene, and oxide products of fusion such as glasses. The form of the oxide carrier is not critical for our purposes; powders, coatings and particularly monolithic support structures formed of these carriers may be treated.

Many of the above oxide carriers do not effect a localized rise in pH adjacent to the solution-carrier interface in aqueous solutions, and the catalyst deposition reaction on these carriers typically proceeds quite slowly. In such cases, the addition of urea to the aqueous solution containing the noble metal ions and the formic acid reductant is useful to markedly increase the rate and extent of the catalyst deposition reaction. Additions of urea comprising between about 1–10% by weight of the aqueous solution are suitable for this purpose.

In most cases the rate of the deposition reaction and the uniformity of the dispersed noble metal coating provided by the process as above-described may be further improved through a pretreatment of the catalyst carrier according to a tin-sensitization procedure. This procedure involves the additional steps, prior to contacting the catalyst carrier with the noble metal-containing solution, of coating the carrier with a hydrolyzable tin compound and then hydrolyzing the tin compound to provide a coating containing a hydrous tin oxide on the carrier. Typically, the carrier is contacted with an aqueous solution of a hydrolyzable tin compound such as an acidified stannous chloride solution, and hydrolysis and removal of the chloride are carried out by contacting the solution-coated carrier with hot water. This tin-sensitization pretreatment assures very rapid and uniform deposition of the noble metal onto the carrier upon contact with the noble metal ion-formic acid reductant solution.

DETAILED DESCRIPTION OF THE INVENTION

The process of the present invention is particularly advantageous in the treatment of oxide carriers which consist of monolithic ceramic catalyst support structures of the honeycomb type, used in the catalytic treatment of flowing fluids, particularly gases. The channeled structure of such suports makes uniform coating with a catalyst using conventional processes difficult, whereas the process of the present invention readily provides a uniform dispersion of catalyst even on the interior channel walls of such supports. Structures which may be suitably treated according to our process may be composed of any of the glasses, oxides, or oxide compounds or solid solutions useful as catalyst supports, or they may be composed of other materials but coated with a suitable oxide carrier. Such structures may be conveniently treated by immersion in the noble-metal-ion-containing solution, and they may optionally be pretreated according to the aforementioned tin sensitization procedure by immersion in an acidified stannous chloride solution followed by immersion in water.

The process of the present invention is not limited to the treatment of large monolithic structures. The uniform deposition of a noble metal catalyst on a powdered oxide carrier is conveniently accomplished by simply dispersing the carrier in the selected treating solutions, and thereafter separating the treated carrier from the solution, for example, by filtration.

Aluminum oxide and tin oxide carriers are particularly suited for treatment according to the present invention because they promote the rapid deposition of the catalyst onto the carrier. For this reason, catalyst support structures comprising alumina, tin oxide, or coatings containing these carriers are preferred for treatment.

As sources of noble metal ions in the aqueous catalyst-containing solution, we prefer to employ soluble noble metal compounds which form halide-complexed noble metal ions such as $PtCl_6^{+2}$ and $PdCl_4^{-2}$ in aqueous solutions. Examples of preferred compounds include $$H_2PtCl_6 \cdot 6H_2O,$$

$PdCl_2 \cdot 2H_2O$, $RhCl_3 \cdot nH_2O$ and $AuCl_3$. However, in the case of silver, which forms an insoluble chloride, the nitrate is preferred. The noble metal ions may be present in the solution in essentially any desired concentration. However, low concentrations of noble metals, typically not exceeding about 5 milligrams of noble metal per milliliter of solution and desirably not exceeding an amount to be quantitatively deposited on an oxide carrier in a single application of the solution, are preferred for reasons of cost. Also, solutions containing platinum, palladium, rhodium and mixtures thereof are preferred for most catalyst applications.

Formic acid is used as the reductant in the process of the present invention because it is apparently unique in its capability of reducing the specified noble metal ions only in the immediate presence of an appropriate metal oxide carrier. Other known reducing agents either reduce and precipitate significant quantities of the noble metal present in the solution prior to the introduction of the carrier, or are ineffective to promote the desired degree of reduction and deposition even on the most active carriers such as alumina. The quantity of formic acid reductant present in the solution is not critical provided it is at least that stoichiometrically required to reduce the desired quantity of noble metal from the solution onto the carrier.

Preferably, the solution will contain only the amount of noble metal which is to be deposited in a single application, and complete or quantitative deposition of all of the noble metal from the solution will be desired. In that event, formic acid additions may range from about 1 to about 50 times the quantity stoichiometrically required to reduce all of the noble metal ions present in the solution to the metallic state. Representative oxidation-reduction reactions for the reduction of platinum and palladium by formic acid are shown below:

$$HCOOH \rightarrow CO_2 + 2H^+ + 2e^-$$
$$4e^- + PtCl_6^{-2} \rightarrow Pt^\circ + 6Cl^-$$
$$2e^- + PdCl_4^{-2} \rightarrow Pd^\circ + 4Cl^-$$

Concentrations of formic acid in excess of about 50 times the stoichiometric requirement should be avoided because they may cause some uncontrolled catalyst reduction, particularly at elevated temperatures.

The preparation of the aqueous solution containing noble metal ions and the formic acid reductant requires no special techniques or precautions. However, both the stability and the effectiveness of the solution are improved if an at least slightly acidic condition is maintained therein. Solutions containing ammonum hydroxide as well as platinic and formic acid having pH values as high as about 9.4 have been prepared, but the deposition of noble metal from such solutions proceeds at a much slower rate. The pH values of typical acidic solutions normally range from about 1 to about 2 prior to use, and up to about 3.5 after deposition of the catalyst.

We have also found that the rate of noble metal deposition from solutions prepared as described can be increased by heating the solution and/or the oxide carrier during the contact interval. Thus the rate of deposition is considerably enhanced by carrying out the carrier-solution contact step at temperatures of 95° C. instead of at room temperature.

Following deposition of the metallic catalyst on the carrier, the carrier bearing the noble metal is typically dried at 110° C. and then further heated to remove residual water, formic acid, urea, etc. therefrom. The temperature and time of this treatment are not critical provided the heating is sufficient to remove these volatile residues. Heating at 500° C. for 1 hour in air, for example, is typically sufficient to treat ceramic honeycomb support structures.

The following specific examples illustrate in more detail the various techniques and procedures which are useful in carrying out the process of the present invention.

EXAMPLE I

A small ceramic monolithic support structure of the honeycomb type is provided. This structure is composed of a crystalline beta-spodumene solid solution, and is completely coated with a mixed-oxide coating consisting of about 80% alumina and 20% silica by weight. It is cylindrical in shape, about 1 inch in diameter and 2 5/16 inches in length, and comprises a multiplicity of parallel, axially-oriented, thin-walled channels or cells to be interiorly coated with a catalyst for the purpose of treating gases or fluids passing therethrough.

A solution consisting essentially of 10 ml. of a palladium chloride solution (containing 1.26 percent by weight of palladium), 25 ml. of distilled water, and 1 ml. of formic acid is prepared. The ceramic support structure described above is completely immersed in this solution, and the vessel containing the solution and structure is immersed in a 95° C. water bath.

After two minutes of heating in this water bath, the ceramic support structure becomes black in appearance, indicating the presence thereon of a finely-divided metallic palladium coating. After five minutes of heating, the palladium solution, which was initially brown, becomes colorless, indicating that essentially all of the palladium has precipitated therefrom. No metallic palladium is visible within the reaction vessel except that present on the monolithic support structure.

After ten minutes of heating, the palladium-coated structure is removed from solution, dried, heated in a hot air oven at 500° C. for one hour to volatilize any residues, and finally tested for catalytic activity by insertion in a flowing gas stream containing carbon monoxide and propylene. The structure is very active in converting the carbon monoxide and propylene present in the gas stream to carbon dioxide and water, and would therefore be quite useful, for example, in the treatment of automotive exhaust gases to remove carbon monoxide and unburned hydrocarbons therefrom.

EXAMPLE II

A small ceramic monolithic support structure coated with an alumina-silica coating, essentially identical to the structure treated in Example I above, is selected for treatment.

A solution consisting essentially of 4 ml. of a chloroplatinic acid solution (containing 2 weight percent platinum), 26 ml. of distilled water, 0.370 grams of urea and 0.25 ml. of formic acid is prepared. The ceramic support structure is completely immersed in this solution, and the solution and support are heated to 95° C. After about five minutes of heating, the support becomes black in appearance due to the deposition of a finely-divided metallic platinum coating thereon. After a 20-minute immersion the support is removed from solution, dried, and heated for one hour at 500° C. in a hot air oven. It is then tested for catalytic activity and found to be very active for the oxidation of carbon monoxide and short chain hydrocarbons.

The presence of urea in the solution as shown in the above example accelerates the deposition of platinum, particularly on supports composed of materials such as beta-spodumene and cordierite which have not been coated with alumina or tin oxide. Urea does not, however, appear to have a major accelerating effect on the deposition of palladium on these oxide supports. If desired, the deposition of platinum from the above-described solution may be carried out at room temperature instead of a 95° C., with substantial deposition of platinum occurring within a period of about 48 hours.

EXAMPLE III

A small alumina-silica coated monolithic ceramic support structure essentially identical to the structures treated in Examples I and II above is provided. This structure is first treated according to a tin-sensitization procedure comprising immersion in an acidified stannous chloride solution consisting of 10 weight percent $SnCl_2 \cdot 2H_2O$ in 1 normal HCl for 10 minutes at room temperature, removal and subsequent immersion in distilled water at 95° C. for 10 minutes to hydrolyze the stannous chloride solution to a hydrous tin oxide, and finally removal and slow drying of the hydrous tin oxide coating at room temperature in air.

The structure sensitized as described is then placed in a warm (85° C.) catalyst solution consisting of 1.67 ml. of a platinum chloride solution (containing 3.6 percent platinum by weight) 27 ml. of distilled water, and 0.25 ml. of formic acid, further heated to 95° C. for 5 minutes, and then removed from the solution, dried, and heated for 1 hour at 500° C. in air. The structure is black in appearance after treatment due to the presence of a finely-divided metallic platinum coating thereon.

The catalyst-bearing structure prepared as described is tested for catalytic activity together with another catalyst-bearing structure which has been treated in the identical catalyst solution according to the identical catalyst deposition procedure but which has not been tin-sensitized. While both support structures are quite active for the oxidation of carbon monoxide and short chain hydrocarbons, the tin-sensitized support demonstrates a higherdegree of oxidation activity as well as better retention of this activity after exposure to accelerated thermal aging at 800° C. for 24 hours in air. It is also noted that depositon of the catalyst on the support structure proceeds more rapidly on the tin-sensitized support.

EXAMPLE IV

Two cordierite ceramic monolithic structures, similar in size and configuration to the structures treated in Example I but not having silica-alumina coatings, are provided. One structure is subjected to the tin-sensitization procedure described in Example III, except that excess stannous chloride solution is removed from the structure with compressed air prior to hydrolysis and drying. The other cordierite structure is not tin-sensitized.

Both structures are completely immersed in catalyst solutions of the composition described in Example III and heated to 95° C. The black coloration evidencing a metallic platinum coating is observed on the tinsensitized support within two minutes of immersion in the catalyst solution. However, the addition of some urea (about 1 gram) to the catalyst solution is required in the case of the unsensitized support to obtain rapid deposition of the catalyst.

Following immersion in the catalyst solution at 95° C. for 20 minutes the catalyst-bearing structures are removed from solution, dried, heated at 500° C. for one hour to remove volatile residues, and finally tested for catalytic activity. Both support structures are quite active for the oxidation of carbon monoxide and hydrocarbons; however, the tin-sensitized support demonstrates a higher degree of oxidation activity as well as better retention of this activity after accelerated thermal aging as described in Example III.

An alternative procedure for tin-sensitizing a support material comprises contacting the support with a stannous chloride solution followed by heating at moderately elevated temperatures to hydrolyze the salt to a hydrous tin oxide. In using this procedure, however, much less concentrated solutions of stannous chloride should preferably be employed; otherwise, excessively heavy coatings of hydrous tin oxide are formed which typically do not adhere strongly to the support. Immersion in aqueous solutions containing 0.25–0.5% $SnCl_2 \cdot 2H_2O$ by weight followed by heating at temperatures up to about 200° C. comprises a suitable procedure. With very low concentrations of $SnCl_2 \cdot 2H_2O$, e.g., about 0.25 weight percent, the use of HCl to stabilize the salt against hydrolysis in solution is not required.

The described tin-sensitization procedures are particularly useful for depositing noble metals from formic-acid containing solutions where alumina or tin oxide are not present in or on the support. Examples of catalyst support oxides, glasses, etc. which have been usefully tin-sensitized for the purpose of coating with noble metal catalysts includes include porous 96% silica glass, porous glass-alumina mixtures, colloidal silica-alumina mixtures, zirconia-titania mixtures, chromium oxide-alumina mixtures, chromium oxide, cerium oxide, thorium oxide and niobium oxide.

From the foregoing description and examples, it is apparent that the process of the present invention constitutes a useful advance in the art of manufacturing noble metal catalyst-bearing devices.

We claim:

1. In a process for depositing a noble metal catalyst on a refractory metal oxide carrier which comprises the step of contacting the refractory metal oxide carrier with a solution containing a formic acid reductant and noble metal ions selected from the group consisting of platinum, palladium, rhodium, gold, silver and mixtures thereof, the improvement which comprises the addition of urea to the solution in an amount ranging about 1–10% by weight thereof.

2. A process according to claim 1 wherein, prior to contacting the refractory metal oxide carrier with the urea-containing solution, the carrier is contacted with an acidified stannous chloride solution to form a coating of said solution thereon, and thereafter contacted with water to hydrolyze the stannous chloride to hydrous tin oxide and to remove chloride ions from the carrier.

3. A process for depositing a noble metal catalyst on the interior channel walls of a metal oxide carrier consisting of a monolithic honeycomb catalyst support structure which comprises the steps of:
   (a) contacting the honeycomb support structure with an acidified stannous chloride solution to form a coating of said solution on the interior channel walls of said structure;
   (b) contacting the solution-coated structure with water to hydrolyze the stannous chloride to a hydrous tin oxide and to remove chloride ions therefrom; and
   (c) contacting the support structure with a solution containing a formic acid reductant and noble metal ions selected from the group consisting of platinum, palladium, rhodium, gold, silver and mixtures thereof to provide a coating of said noble metal on said support structure.

References Cited

UNITED STATES PATENTS

| | | | |
|---|---|---|---|
| 3,060,133 | 10/1962 | Jockers et al. | 252—466 Pt |
| 3,123,574 | 3/1064 | Zajcew | 252—447 |
| 3,278,608 | 10/1966 | Clement | 252—466 Pt |
| 3,359,214 | 12/1967 | Aftandilian | 252—45 X |
| 3,373,219 | 3/1968 | Krömg | 252—466 Pt |
| 3,520,915 | 7/1970 | Kominaml et al. | 252—454 |
| 3,635,761 | 1/1972 | Haag et al. | 117—100 B |

U.S. Cl. X.R.

117—100 B; 252—454, 455 R, 458, 459, 460, 462, 463, 465, 466 Pt, 472, 476

DANIEL E. WYMAN, Primary Examiner

A. P. DEMERS, Assistant Examiner